United States Patent [19]
Sheehan et al.

[11] Patent Number: 5,960,891
[45] Date of Patent: *Oct. 5, 1999

[54] MULTIPURPOSE SCOOP TOOL

[76] Inventors: Kelly C. Sheehan, 3838–83$^{rd}$ Ave. SE., Mercer Island, Wash. 98040; Michael O. Roser, 2925–162nd Ave. SE., Bellevue, Wash. 98008

[*] Notice: This patent is subject to a terminal disclaimer.

[21] Appl. No.: 09/022,297

[22] Filed: Feb. 11, 1998

Related U.S. Application Data

[63] Continuation-in-part of application No. 08/692,234, Aug. 6, 1996, Pat. No. 5,765,648.

[51] Int. Cl.$^6$ .............................. A01B 1/02
[52] U.S. Cl. .................. 172/381; 294/55; 7/116; D8/10
[58] Field of Search .............. 172/371, 381, 172/377, 380; 294/49, 55, 57, 58, 54.5; 7/114, 116; D8/10

[56] References Cited

U.S. PATENT DOCUMENTS

| | | |
|---|---|---|
| D. 230,695 | 3/1974 | Bartz . |
| D. 236,424 | 8/1975 | Philpott, Sr. ............... D8/11 |
| D. 272,799 | 2/1984 | Pluss ......................... D8/10 |
| D. 352,873 | 11/1994 | Chen ......................... D8/10 |
| 465,448 | 12/1891 | Bostwick . |
| 557,988 | 4/1896 | Gageby . |
| 668,982 | 2/1901 | Covel . |
| 916,820 | 3/1909 | Wood . |
| 944,859 | 12/1909 | Harris ................... 172/371 X |
| 1,190,108 | 7/1916 | Chabot . |
| 1,271,287 | 7/1918 | Daly . |
| 1,323,980 | 12/1919 | Hare . |
| 1,713,529 | 5/1929 | Grant . |
| 4,002,207 | 1/1977 | Bartz ......................... 172/378 |
| 4,950,013 | 8/1990 | Yonkers ....................... 294/49 |

FOREIGN PATENT DOCUMENTS

| | | | |
|---|---|---|---|
| 1540517 | 9/1968 | France ........................ 172/371 |
| 1501932 | 8/1989 | U.S.S.R. ..................... 172/371 |

*Primary Examiner*—Christopher J. Novosad
*Attorney, Agent, or Firm*—Garrison & Associates PS; Matthew J. Marquardt; David L. Garrison

[57] ABSTRACT

A multipurpose tool and a method for indoor or outdoor gardening, planting, and soil working are disclosed. The tool and method incorporate the capabilities of scooping, cutting, scraping, loosening, working, furrowing, trenching, digging, removing, and replacing kitchen commodities, household dirt or garden soil; of setting and removing plants; of weeding; of scraping, emptying, or cleaning planters, pots, and other kitchen or gardening containers, especially those having tight corners; and of cutting and removing plant roots and other obstacles found in or around soil. Preferred embodiments of the tool aspect of the invention provide a generally dished blade with a highly curved, offset pointed tip. Serrated blade edges for cutting of roots and other obstacles are optionally provided. The method includes a procedure for loosening, furrowing, digging, and excavating soil with a single tool.

12 Claims, 4 Drawing Sheets

MULTIPURPOSE SCOOP TOOL

This application is a continuation in part of prior application Ser. No. 08/692,234, filed Aug. 6, 1996, and entitled Multipurpose Garden Tool now U.S. Pat. No. 5,765,648. No patenting, abandonment, or termination of proceedings has occurred in the prior application.

TECHNICAL FIELD

The invention relates to the field of hand held tools; more particularly, it relates to method and apparatus for utilitarian scooping and digging, and in particular to a multipurpose scoop tool.

BACKGROUND OF THE INVENTION

Hand held tools have progressed over the centuries from those of the rudest quality, such as sticks dragged upon the ground for plows, to bladed shovels and spades, shears, hammers, chisels, knives, forks and spoons. Always each tool had but a single job: the shovel and the spade to replace the hands in digging; the hoe and the plow to take the place of sticks for furrowing and breaking the soil; shears, saws, and clippers to take up cutting of vegetation. In the home and in the kitchen, it has been much the same: kitchen implements replaced the ruder functions of fingers and teeth for eating and cutting, and of sticks for stirring. Thus one who worked the soil needed constantly at hand a variety of instruments: for farming, a plow, a harvester, a shovel, a scythe, a baler, a pitchfork; for gardening, a shovel, a rake, a spade, a trowel, a hoe, a pair of clippers, and occasionally a saw or knife. In the house, the variety has been less, but the utility has not been there either.

Development has been slow. Even today, with the integration of gasoline engines and electric motors, it is the rule that one tool performs one job; and the job that tool does has been done in essentially the same way by essentially identical tools for many hundreds of years. At most, the tool differs from its predecessors only in its source of power: tractors tow plows essentially identical to those of ancient times; hedge clippers work in essentially the same fashion as hand held models; even backhoes lend mere power to the digging of shovel blades or hoes. And so today, thousands of years since the beginnings of plant husbandry and home economics, people work the same basic implements, one implement at a time, and take to work each time the same array of hand held tools.

In the modern kitchen, even with the amazing array of appliances available to today's homemaker, many common chores are either still rudely done or ineffectively accomplished with available hand implements. For example, scooping hard ice cream from the bottom of a container, or cleaning out a pumpkin are chores best relegated to the punishment list.

And to do so at low cost, through the provision of a simple, strong, elegant, and durable implement is innovation.

What is needed in the area of hand held tools for kitchen and garden is a single tool to cut and scoop fruits and vegetables and commodities from containers and still be available to loosen, dig, and furrow soil, to weed or plant effectively and efficiently with just one instrument, and to remove, replace, and cultivate plants without need of a box full of implements.

DISCLOSURE OF THE INVENTION

Accordingly, it is an object of the invention to provide a single garden tool capable of performing many or all of the tasks faced by the gardener, the landscaper, or the planter.

It is another object of the invention to provide a single home or kitchen tool capable of performing many of the tasks engendered in the home and kitchen, and in particular, scooping, scraping, cutting, serving and stirring.

It is a further object of the invention to provide in one instrument a tool for loosening, working, furrowing, trenching, digging, removing, and replacing soil; for setting or removing indoor or outdoor plants; for weeding; for scraping, emptying, or cleaning planters, pots, and other gardening containers, especially those having tight corners; and for cutting roots or other objects.

It is another object of the invention to provide a hand held tool which will act as an extension of the hand, allowing the tool to perform many tasks while reducing bending stresses in the user's wrist.

It is another object of the invention to provide a blade for a garden tool which will allow the tool to be used for the setting and removal of bulbs and other plants without damaging the bulbs and plants.

It is another object of the invention to provide a tool capable of performing all of the above tasks without the necessity of the user shifting his or her grip upon the handle of the tool.

It is another object of the invention to provide a long lasting, durable, and reliable tool of the type described.

It is another object of the invention to provide a method of performing any or all of the above tasks with a single tool.

It is another object of the invention to provide the above described tool or tools at modest cost.

It is another object of the invention to provide tools of the type described above which do not require routine or complex maintenance.

It is a further object of the invention to provide a tool with a generally dished region and a curved pointed tip, with the tip projecting generally up and out of the dished region.

It is another object of the invention to provide a tool with serrated edge regions.

It is yet another object of the invention to meet any or all of the needs summarized above.

These and such other objects of the invention as will become evident from the disclosure below are met by the invention disclosed herein.

The invention addresses these needs and provides such a system. The invention represents a new versatility in garden or field working, and in kitchen, garden or field working tools; the invention reduces the number and weight of tools required to perform most if not all of the tasks of gardening or horticulture and to accomplish all the essentials of plant husbandry, and provides new utility in the home and kitchen previously lacking in conventional home tools and kitchen implements.

The invention provides a multipurpose kitchen and garden tool, and a method for indoor or outdoor gardening, planting, and soil working. The tool and method incorporate the capabilities of scooping, cutting, scraping, loosening, working, furrowing, trenching, digging, removing, and replacing kitchen commodities, household dirt or garden soil; of setting and removing plants; of weeding; of scraping, emptying, or cleaning planters, pots, and other kitchen or gardening containers, especially those having tight corners; and of cutting and removing plant roots and other obstacles found in or around soil. The method includes a procedure for loosening, furrowing, digging, and excavating soil with a single tool.

In a tool aspect of the invention, one embodiment is a blade for a tool with a generally dished region and a pointed tip. The pointed tip has a tip point, and the blade has a grip axis. The tip preferably is highly curved and dished itself, and the tip point is offset from the grip axis by an offset distance. This offset distance is sometimes also called the clearance distance. Preferred embodiments of the blade are adapted to engage a handle at a handle end of the blade opposite from the tip point, and have at least one serrated edge region adjacent to the tip.

In some embodiments, the pointed tip is dished to such an extent that, when the tool is held with the grip axis substantially vertically aligned and the handle end is held upward, the tip cradles soil.

By referring to the blade as dished, or to a dished region, it is meant that the blade, at least in some portion thereof, is generally spoon shaped, or that the region includes a concavity, or a relatively dished or bowled portion. The dished region is generally located within the central portion of the blade between the handle end and the tip; in preferred embodiments, the concavity is generally bounded by relatively curved or raised edges.

The tool blade of the invention preferably has a pointed tip and the point thereof is referred to as the tip point. The tip is preferably more highly curved than the dished region of the blade, and the tip preferably has its own dish characteristics independent of the dished region of the blade.

Another tool embodiment of the invention is also a blade for a tool. The blade has a generally dished region, and the dished region has a tip, a periphery and a base point. The periphery has a tip point on the tip, and the base point lies at an end of the dished region generally opposite the tip point. In this embodiment, a substantial portion of the periphery lies below a tool reference plane passing through the tip point and the base point. This embodiment preferably also has a handle end at an end of the blade opposite from the tip point, and the handle end is particularly adapted to engage a handle. Preferably, the base point does not lie anywhere on the handle end.

In distinguishing the invention from other tools, it is useful to refer to the periphery of the dished region; the periphery generally being the more or less continuous edge or sum of edges of all of the edges of the dished region, generally not including any portion of a handle end of the blade. The periphery has a tip point which is generally the same point as the tip point of the blade tip. A handle end on a blade may preferably be adapted for engaging a handle to be fitted to the blade as described; however, the handle end of the blade is also any structural portion of the blade that is either particularly adapted to receive and engage a handle, or that is not particularly part of the dished region of the blade, such as by having no particular curvature of its own, or no curvature that was part of a curvature of the dished region. The blade also has a base point for defining a tool reference plane, and the base point may be thought of as the point on the blade furthest from the tip point without venturing onto the handle end.

Another embodiment of the invention is a method of gardening with the following the steps:

(a) one drives a tipped hand tool downwardly into some soil;
(b) one then pulls the tool through the soil toward oneself to furrow the soil, in such a way that one is not required to make a change of grip or to make any realignment of a grip axis of the tool.

The step of pulling the tool through the soil may best be accomplished by pulling the tool toward the tool user in a direction along the grip axis. By way of illustration, it may readily be appreciated that a pull toward the user along the grip axis of a conventional trowel would be a useless action. The method may also have the step of employing a sawing motion with the tool to cut through roots or debris in the soil. To furrow some soil is to leave a furrow in it or alternatively to leave an elongate hole in the soil. As a user pulls the tool through the soil, having already gripped the tool with the hand to drive it into the soil, the user preferably does not have to change hand grip position or hand orientation on the grip or handle of the tool, and the grip axis of the tool does not have to be changed substantially, as for example it would have to be changed if the tool were a conventional trowel. With a trowel, the driving motion would be a stabbing kind of motion into the soil, and the grip would be a stabbing grip. Furrowing with the trowel would then require both a change in hand grip and also a change in grip axis orientation (from near vertical to rather horizontal), and the furrowing then would still be push rather than a pull. Holding the trowel so as not to require such changes, would only allow a thrust away kind of driving into the soil, almost horizontal.

In as much as it is generally to be expected that the tool will be held in a user's hand, the tool in preferred embodiments provides a handle or grip for the convenience of the user in handling or using the tool. The handle or grip is most usually located at an end of the blade opposite the tip; and, being of otherwise generally common configuration, the handle or grip serves to define, by means of the centers of its aggregated cross sections, an axis which might be referred to as the grip axis. For example, in embodiments provided with a straight, more or less conical or cylindrical handle or grip, such as might be found on a common trowel, the grip axis is identified as the axis running through the more or less circular cross sections of the handle; that is, down the center of the grip. It is this grip axis from which the tip of the invention, or a point provided on the tip, is offset.

"Offset," as used in this disclosure, means that the tip or the point of the blade is curved or deflected upward (colloquially, one might say that the tip or point was "bent" up or upward), out of the grip axis and away from the body of the blade. That is, if one were, for example, to take a common table spoon and bend the tip upward ("up" or "upward" in this sense meaning generally upward in the vertical direction when the tool or spoon is held upright in such a position that water would remain within its bowl or concavity) so that the tip passed out of the grip axis, the tip would be offset.

The distance by which the tip or the point of any particular embodiment of the invention is offset with respect to the grip axis depends upon the use to which the particular embodiment is to be put. Generally, the offset distance is at least that distance required to permit the user to drag the point of the tool along the ground or other excavant in the direction of the grip axis, with the grip axis more or less parallel to the excavant, without interference from any other portion of the tool or from the user's hand: that is, the tip or the point is generally minimally offset from the grip axis by a distance sufficient to clear the user's hand and all parts of the tool other than the tip or the point from interference with the ground or other excavant when the point is drawn along the excavant in the direction of the grip axis, with the grip axis being held more or less parallel to the excavant. Such a minimal distance or offset is referred to as a clearance distance.

For embodiments of the invention intended for general indoor or outdoor garden or indoor use, the preferred offset, or clearance distance, is that offset great enough to allow the tool to be used for loosening soil or other material (such as for example the pulp of a squash or the surface of a container of ice cream) with the tip or point, and for furrowing or scraping the soil or other material with the tip or point, without interference from the remainder of the tool, or from the hand of the user, with the ground or other material.

Another aspect of the invention is a blade for a tool, also with a generally dished (or spoon shaped) region and a pointed tip, and with the pointed tip projecting generally up and out of the dished region. The blade has a periphery on the dished region, and the periphery optionally has at least one serrated, or toothed, edge region.

Yet another aspect of the invention is a blade for a tool, and the blade has a region of curvature along its length for a substantial portion of the length and a region of curvature along its width for a substantial portion of the width, with the regions of curvature in the blade thereby forming a dished region. The dished region has edges and a periphery defined by its edges, and the periphery is scalloped along the blade's length, and preferably proximate a center of the blade's length.

Another way of describing the shape of the dished region of the blade is to say that its curvature is comprised of regions of curvature along substantial portions of the blade's length and width. Substantial portions are generally percentages of length or width greater than about 10% up to 100%, and preferably between 30% and 100%. Generally, only curvatures that are only incidental to junctures of surfaces, such as fillets between adjoining plates, are to be preferably precluded from consideration as regions of curvature.

To describe the periphery as scalloped is to say, in one sense, cut away (though there may have been no actual cutting away of the periphery); scalloped means having a scallop or one or more indentations or flutes in the periphery itself. One or more scallop indentations are preferably to be found on the periphery, along the length of the blade; with at least one scallop proximate, that is overlapping or near, the center of the blade's length (as projected out onto the periphery). One measure of the degree to which the periphery is scalloped is the extent to which water can fill substantially the entire dished region. A preferred degree of scalloping is that extent whereby water can not fill substantially the entire dished region, when the dished region is held upward; that is the water runs out the scalloped openings in the periphery before the water can run over the periphery itself. Optionally, the periphery is scalloped to an extent whereby, when the blade is laid inverted on a flat surface, more than an insubstantial space between the periphery in the scallop and the flat surface can be seen.

In many embodiments of the invention the tip of the blade is dished, sometimes independently of the shape of the remainder of the blade. That is, the tip itself is dish or bowl shaped, without regard to the geometry of the rest of the tool, so that it includes a concavity, or a relatively dished or bowled portion, generally located within the central portion of the tip, which is bounded by relatively curved or raised edges. In preferred embodiments of the invention the tip is dished such that when the tool is held with the grip axis substantially aligned with the vertical and the handle up, the tip itself would hold, support, or "cradle," soil (or ice cream or other excavant), so that for example soil might be lifted out of a relatively small or narrow excavation by holding the tool in the manner just described and lifting it upward out of the hole. This aspect of the invention allows among other things for the digging of especially deep yet narrow holes, providing a relatively "clean" (or smooth sided) hole for planting, and the like, or for the relatively complete and through excavation of containers holding commodities such as ice cream, doughs, or other materials, or, where the embodiment of the invention is suitably sized, the inside for fruit or vegetable shells.

In those embodiments of the tool aspect of the invention having handles or grips, the grip or handle may be provided as an integral part of a handle end of the blade or in other conventional or nonconventional manner. In most cases, the handle will be provided at the handle end of the blade generally opposite the tip, as is common with conventional garden tools. In many embodiments of the invention, the handle is short enough to allow the tool to be easily or comfortably manipulated, in the performance of most or many of the tasks described, with the use of a single hand. Other embodiments provide longer handles, so as to allow the tool to be worked with both hands, often with the hands spread sufficiently far to allow the user to apply a reasonable amount of leverage on the tool.

Generally preferred embodiments of the tool aspect of the invention also provide one or more serrated regions along the edge of the blade, most often along the edge of the blade adjacent to the tip. These serrated edge regions are used for cutting or otherwise loosening or removing the obstacles or debris commonly encountered in or about the home or garden or the soil, such as residue in corners, roots, embedded sticks, small rocks, or hard pan or clay soil; and for cutting through materials such as ice cream boxes and vegetable shells. They can also be used for cutting through artificial obstacles, such as the sides of cardboard ice cream boxes.

Another aspect of the invention is the provision of a complete home or garden tool consisting of a handle and a blade, the blade having an offset pointed tip and a scoop portion. In this aspect the handle is fixed to or made integral with the blade in conventional or nonconventional fashion, and is adapted so that the user may perform a variety of tasks, such as driving the tip point downward into soil or other excavant to loosen it, furrowing, or otherwise excavating the excavant by dragging the tool back toward the user by the handle, and scooping soil out of the furrow or excavation, generally by thrusting the side of the blade into or under the loosened excavant, all without the user having to shift his or her grip on the handle.

Preferred embodiments of this aspect of the invention generally comprise an otherwise conventional, substantially straight handle fixed to one end of the blade adjacent to a generally dished, bowled, concave, or spoon shaped scoop portion of the blade, and, at an opposite end of the blade from the handle, an offset pointed tip, the offset of the pointed tip being described generally in the same terms already set forth above. Such a configuration of the tool lends itself readily to the continuous, comfortable, convenient, and repetitious use of the tool for loosening, furrowing or otherwise digging or excavating, cradling soil, foods, or other excavants from deep or narrow holes, spaces, or containers, and removing the excavants in the manner described merely by gripping or grasping the tool by the handle, in the case of a straight handled embodiment of the invention, with the fingers wrapped around the handle in such a fashion as to leave the blade of the tool extending from the handle on the side of the grip nearest the tip of the thumb, and, holding the tool inverted in such fashion ("inverted" meaning the opposite of upward as described above), thrusting the tool tip down into the excavant, and loosening the excavant, working the tool front and back, sideways, or up and down, if needed, to do so; furrowing the excavant, if need be, by pulling the tool back toward the user along the axis of the handle (the grip axis previously defined), and scooping soil into the scoop portion of the blade by thrusting the blade sideways into or under the soil.

It may readily be seen that the tool described lends itself to a novel usage, when gripped in such fashion (i.e., without a necessity for the user to shift his or her grip on the handle between the described steps), in marked contrast to the usage that would be required with conventional spades or garden tools.

Provision of the blade of this aspect of the invention with a serrated edge region permits direct extension of the use of the tool to the sawing or cutting of roots or other obstacles or debris encountered when working soil or other materials: the user merely alternately thrusts the tool forward and pulls it back toward himself or herself, while holding the tool as previously described, with the serrated edge region held against the root or other obstacle, so that the serrations saw through, snag, or otherwise abrade or pull the obstacle until it is severed or otherwise loosened for removal. It may be readily seen that such sawing operations may be performed, like the loosening, furrowing, and scooping operations described above, without the necessity of the user shifting his or her grip upon the handle.

A further aspect of the invention lies in the use of a tipped hand garden tool in the manner generally described: by thrusting the tip of the tool downwardly into soil or other excavant, and working it back and forth, sideways, or up and down, if necessary, to loosen the excavant; pulling the tool back toward the user along the grip axis to furrow the excavant, and scooping excavant from the furrow or other excavation thus made to remove it. Generally, the furrowing portion of the method is accomplished by holding the tool in the manner described above and pulling it toward the body of the user along the grip axis of the handle.

Likewise, the method may optionally be extended to include sawing through or otherwise loosening or removing roots or other obstacles in the manner described, by engaging an (optionally serrated) edge of the tool against the root or obstacle and alternately thrusting the tool forward and drawing it back against the root until it is severed or otherwise snagged or loosened.

It is readily seen that any or all of the above aspects of the invention might be employed equally well indoors or out, in fields, for agricultural or other horticultural purposes, or in smaller indoor or outdoor gardens, in the home and kitchen, and with garden, field or potted plants.

BEST MODE OF CARRYING OUT THE INVENTION

Figure 1:
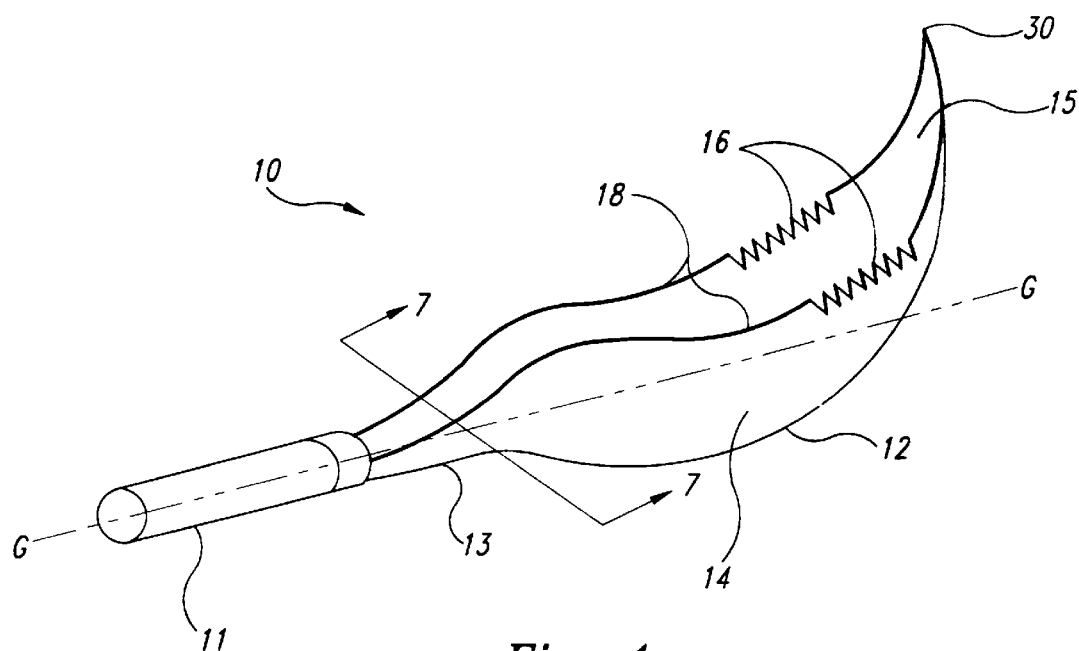
FIG. 1 is a rear perspective view of a preferred embodiment of the invention.

For purposes of this disclosure, the term "excavant" means any material capable of being dug, shoveled, scooped, furrowed, loosened, or otherwise excavated. Examples of such materials include, without limitation, dirt, soil, gravel, and many food stuffs.

Turning now to the drawings, the invention will be described in a preferred embodiment by reference to the numerals of the drawing figures wherein like numbers indicate like parts.

FIG. 1 shows a preferred embodiment of the present invention. Tool 10 comprises handle 11 and blade 12. Blade 12 further comprises pointed tip 15, which has a tip point 30. Handle 11 engages blade 12 at specially adapted handle end 13 of blade 12, at the opposite end from tip 15. Handle end 13 may comprise any combination of materials or shapes including special tapers or other shapings of one end of blade 12 itself, which are aptly adapted, as will be appreciated by those skilled in the art, for engaging a conventional handle 11 to blade 12.

Figure 2:
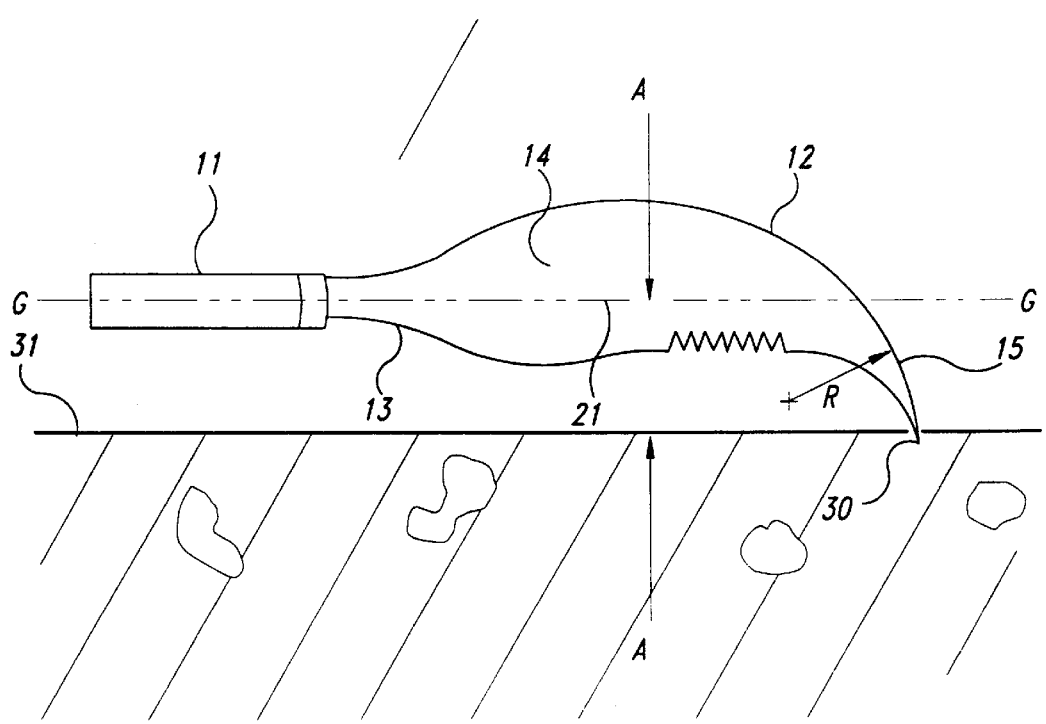
FIG. 2 is a side view of a preferred embodiment of the invention in inverted position for scraping or furrowing soil.

Serrated (or toothed) regions 16 are disposed at the edges of blade 12 preferably adjacent to tip 15. Blade 12 further comprises generally dished or bowled region 14, which may also herein be referred to as the scoop portion. Handle or grip 11 may or may not comprise a separate dedicated handle piece or assembly, but handle 11 and/or handle end 13 generally serve to define grip axis G, which runs more or less along the center of handle or grip 11 and handle end 13, and therefore defines the direction in which pulling or pushing forces are generally applied when the tool is used, as shown in FIG. 2, in a tip down, or "inverted", tool attitude so as to furrow soil. As may be seen in FIG. 2, handle 11 is substantially concentric with grip axis G.

Also as shown in FIGS. 1 and 2, blade 12 and scoop portion 14 are sufficiently large and sufficiently spoon shaped to allow the scooping of substantial portions of various kinds of matter, such as soil after the soil has been loosened or otherwise prepared for removal. The size of blade 12 will depend upon the application to which the tool is put, whether indoor or outdoor usage is contemplated, domestic or horticultural, and upon the size of the furrow, hole, or other excavation the tool is employed to make. For example, it will occur to the skilled designer of garden tools to make a relatively larger tool, according to the invention, for the purpose of setting medium to large sized plants than for digging narrow furrows for the planting of seeds or for many kitchen tasks such as scooping ice cream. Other particular blade or scoop sizes for a given application will also occur to those skilled in the art.

As shown in FIG. 2, tip portion 15 is generally disposed at the opposite end of blade 12 from handle 11, and in generally preferred embodiments tip 15 is substantially offset from scoop portion 14 of blade 12. That is, tip 15 is offset by an offset distance, and in preferred embodiments angled up, or out, and away from scoop portion 14, in such a manner as to allow point 30 and tip 15 to both furrow soil without interference from scoop portion 14 or other portions of blade 12 or the tool, or from the hand of the tool user, when the tip is pulled through the soil by the tool user along grip axis G, whenever grip axis G is parallel to the ground (horizontal). Tip 15 is also angled and offset from scoop portion 14 to pierce the surface of the excavant when the tool is driven point down into soil or other material and to sink point 30 to a working depth in the excavant, without tool 10 being stopped or impeded by scoop portion 14 or other portions of blade 12 or of the tool, or by the hand and knuckles of the user. The offset distance referred to is shown in FIG. 2 as clearance distance A, the distance between grip axis G in inverted tool 10 and ground surface 31.

A working depth to which tip point 30 is to sink is that depth which will allow the user of the tool to make effective use of the tool in loosening the material into which the tip is driven, and thus would depend upon the quality of the soil and the purpose of the particular use. In loosening very hard packed, fine soil or clay, for example, a relatively shallow penetration of the tip (of the order of perhaps ½ to 2 inches) would generally suffice, whereas for looser, more extensively clodded or moist soil penetrations would generally run deeper—more along the order of 1 to 3 inches. Because the depth to which point 30 will be expected to penetrate materials will generally be somewhat smaller than the offset required to achieve it, due to the desirability of leaving a reasonable clearance between soil surface 31 and the lowest extremity of the tool or the user's hand, clearance distance A will therefore generally vary from approximately 1 to 4 inches, depending upon the size of the tool and the particular application to which it is put.

Clearance distance A may be varied, short of causing interference with the function of the tool for the purposes described. In general, particular values of the clearance distance will depend upon the task to be performed, the quality of the material worked, the object of the working of the material (e.g. planting, furrowing, digging, removing plants, weeding, loosening soil, scooping foods), and the strength and skill of the user. It has been found that for typical indoor or outdoor gardening applications, good results have been achieved with an clearance distance of 2½ to 4 inches in a tool having an overall length from the tip to the distal end of the handle of 10 to 16 inches. In particular, a tool approximately 12 inches long and having a clearance distance of approximately 2½ inches has performed very well for general indoor and outdoor gardening. Tools somewhat smaller, though proportioned similarly, have been found to have good general utility in the kitchen and home for chores appropriate to those locations as well. Preferably then, point 30 is offset from the body of blade 12 to allow the furrowing and digging actions described, and any geometry which will permit those actions will generally suffice.

Figure 3:
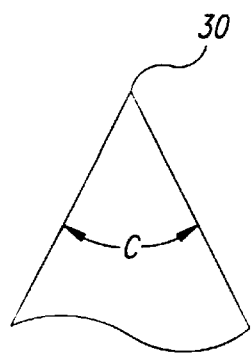
FIGS. 3 and 4 are plan views of preferred and alternate embodiments of the tip portion of the invention.
Figure 4:
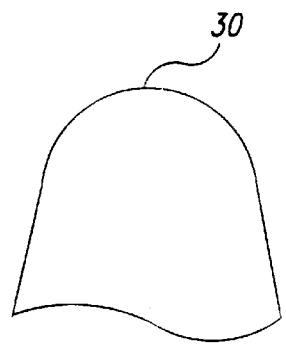

Aside from being substantially offset from blade 12, tip 15 may be shaped according to its immediate intended purpose. For tools intended for narrow furrowing or picking at hard pan or other packed or difficult soil, the tip may be sharply pointed, as shown in FIGS. 1 and 3. For working of looser soil, surface scraping, or the digging of broader furrows, or for some types of general kitchen work, the tip may come to a more rounded point, as shown in FIG. 4. A sharply pointed tip of the type shown in FIG. 3, having an angle C of approximately 30 to 60 degrees, has been found to give good results for an embodiment of the invention intended for general indoor or outdoor use.

Serrated regions 16 may in some embodiments be located on one or both edges of blade 12, between tip 15 and handle end 13 or handle 11, as shown in FIG. 1. In generally preferred embodiments, serrations are provided adjacent to tip 15, in order to facilitate sawing of roots or other debris while digging. The selection of a particular cutting geometry for the serrations themselves will occur to the skilled tool designer; serrations may take any of a great variety of shapes, including those of common wood saws.

Figure 5:
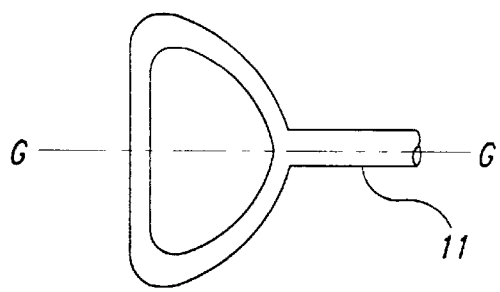
FIGS. 5 and 6 are side views of handles for the invention.
Figure 6:
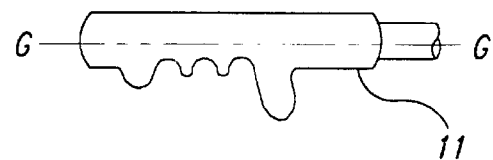

Handle or grip 11, where provided, may be of any suitable type, many of which are conventional. Preferred embodiments employ straight, ferruled handles, as shown in FIGS. 1 and 2, but they may alternatively be of the closed grip type depicted in FIG. 5, or any type permitting either the application of pushing or pulling forces along grip axis G, or hammer style swinging of the tool so that tip 15 and/or point 30 may be driven into the ground with the direction of applied striking force on the soil perpendicular or substantially normal to the ground as shown in FIG. 2, while permitting scooping of soil without the necessity of substantially shifting the grip of the user upon the tool. Custom grips like those shown in FIGS. 5 and 6 may also be provided. Moreover, a handle or grip may be attached to the blade in any suitable fashion, such as by riveting, gluing, bolting, or the like, or it may be provided as an integral portion of the blade itself. Selection of suitable handle or grip designs will occur to the skilled garden tool designer. Materials employed for handle 11 are also conventional.

Figure 8:
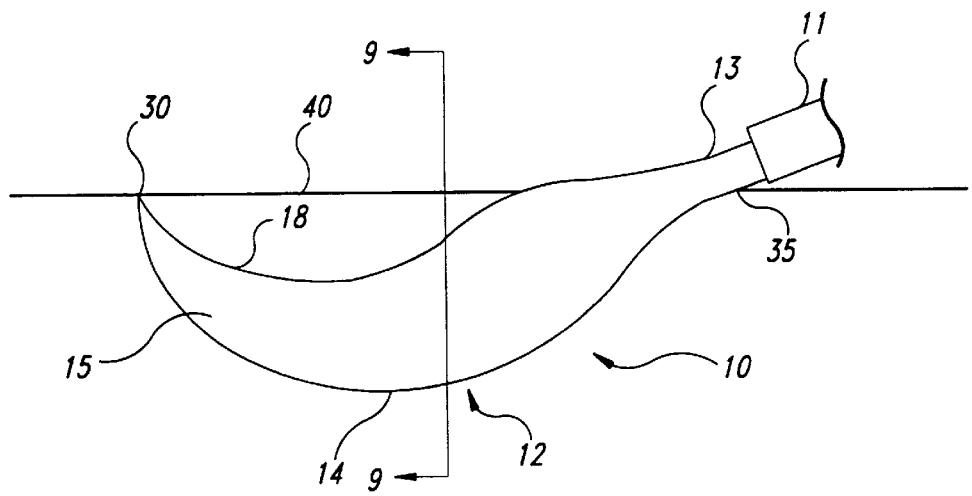
FIG. 8 is a perspective side view of an alternative method of describing a preferred embodiment of the invention.

In FIG. 8, a tool reference plane 40 is illustrated intersecting blade 12 and passing through tip point 30 and base point 35. Base point 35 lies at the end of dished region 14, generally opposite tip point 30. Tip point 30 lies on periphery 18 of blade 12, at the apex of pointed tip 15. Periphery 18 is defined generally by the sum of the exposed edges of blade 12, including tip 15, but not including any part of handle end 13. Base point 35 also does not lie on any part of handle end 13; rather, base point 35 may be thought of as the point on blade 12 furthest from tip point 30, without venturing onto handle end 13. Base point 35 will generally not be on periphery 18, but will generally appear on a line roughly bisecting blade 12 from tip to handle, and rather below the periphery, though small variations in positioning and defining a base point will not greatly influence the definition or usage of the tool reference plane. Where periphery 18 is unbroken or continuous around the entire edge of blase 12, and no part of the periphery is subsumed into handle end 13, then base point 35 can be found on periphery 18.

Figure 9:
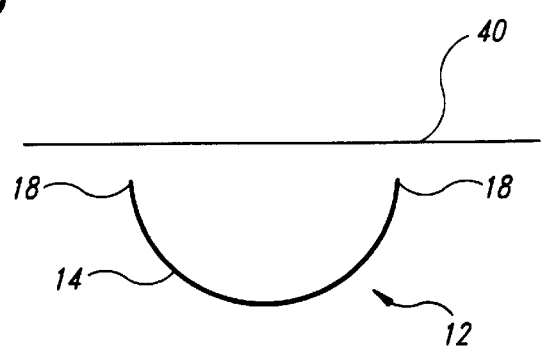
FIG. 9 is a cross section through line 9—9 of FIG. 8 of a curved section of the blade of the invention.

The orientation of reference plane 40 to blade 12 is important for defining certain novel characteristics of the invention; however it will appear that reference plane 40 does not itself play any part in the functionality of the invention. It serves rather as a point (or plane in this case) of reference, from which to view the invention and appreciate some of its novel aspects. After locating tip point 30 and base point 35 and passing a plane through them (so that the plane, edge on, appears as illustrated in FIGS. 8 and 9), the plane is tilted relative to blade 12 (or blade 12 is "swung", as if rotatably mounted on an imaginary axle passing through tip point 30 and base point 35, so that it "hangs" freely beneath the plane) so that a line produced from the center of mass of blade 12 to perpendicularly intersect the line segment defined by tip point 30 and base point 35 will also be perpendicular to the plane (as illustrated in FIG. 9). The plane then becomes reference plane 40.

The words "below" and "beneath" and "under", when employed in the context of reference plane 40 and blade 12, generally refer to that side of reference plane 40 on which the center of mass of blade 12 lies. Thus, for example in FIG. 8, with the figure oriented to read the numerals in their upright positions, blade 12 lies predominantly below, beneath and under reference plane 40. In addition, in FIG. 8 it may be seen that a substantial portion of periphery 18 running between tip point 30 to a location just above base point 35 long both edges of blade 12 lies below tool reference plane 40.

In preferred embodiments generally having between 12 and 18 inches of periphery, a substantial portion of the periphery such as approximately 70% (roughly 8.5 to 13.5 inches) of periphery 18 will lie below tool reference plane 40. Embodiments with very little periphery below a reference plane, as defined above, can be made to serve, as well as can embodiments exceeding 70%, up to 100%, but it is believed that a range of between 30% and 80% is best employed. In preferred embodiments with smoothly dished blades having overall blade lengths in the 7 to 10 inch range, the distance by which periphery 18 drops at maximum below reference plane 40 will be in the range of 1 to 2 inches. Again, embodiments with maximum periphery drop values above or below this range can be made to serve, but tool efficiency is believed to decrease sharply with periphery drops greater than 2 inches in the stated blade length range (requiring as it would a relatively shallower, less dished, blade at the point of maximum drop), as well as with peripheries dropping a mere fraction of a centimeter below the plane. Nonetheless, it is believed that all such variations in periphery drop below the plane, and in length or percentage of periphery below the plane, fall within the meaning of substantial portion of the periphery and therefore within the scope of the invention.

Figure 10:
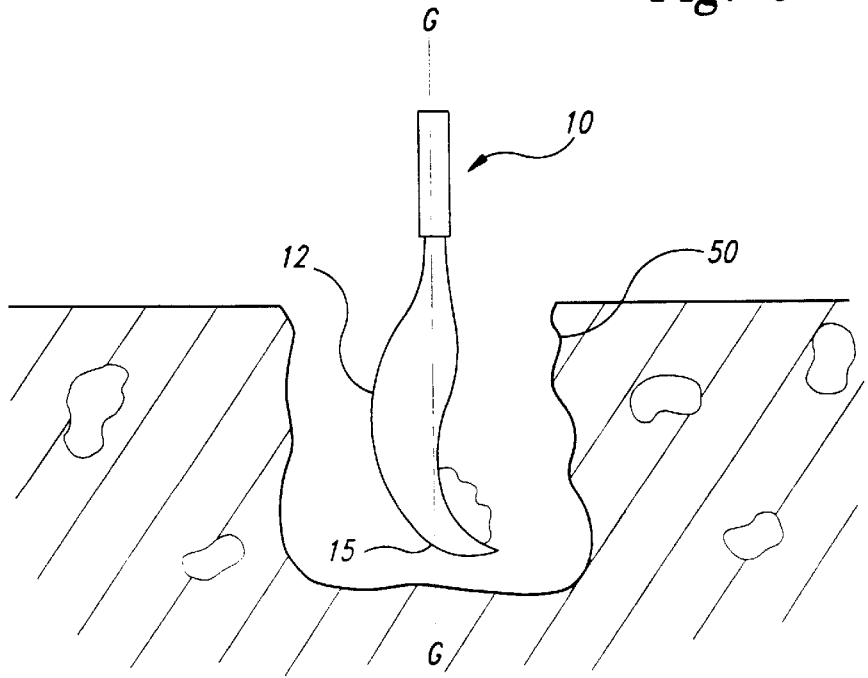
FIG. 10 is a side view of a preferred method of using the invention.

FIG. 10 depicts a preferred embodiment of the invention 10 being used to cradle soil from a relatively deep, narrow hole 50. Tip portion 15 of blade 12 is sufficiently dished itself to allow tip 15, when tool 10 is held with grip axis G substantially vertically aligned and grip or handle 11 uppermost, to hold or cradle soil, so that the soil may be extracted from hole 50. It will be understood immediately that the exact geometry, or the extent of required dishing, of tip 15 for the purpose of cradling soil in this manner will depend upon the nature of the soil material and the type of excavation a particular embodiment of the tool is intended to make. For example, less dishing will be required for removal of damp soil, or soil otherwise cohesive or disposed to cling, than for the removal of loose dry sand. A preferred embodiment of the invention intended for general indoor or outdoor garden use with moderately solid, cohesive soil, employs a radius of curvature R (as shown in FIG. 2) of from approximately one to approximately four inches swept through an arc of approximately 30 to approximately 100 degrees (that is, giving a spherical section of approximately ⅛th or more) to give a satisfactory dishing, together with a tip width cross sectional curvature of from approximately two to approximately three inches in radius.

Figure 11C:
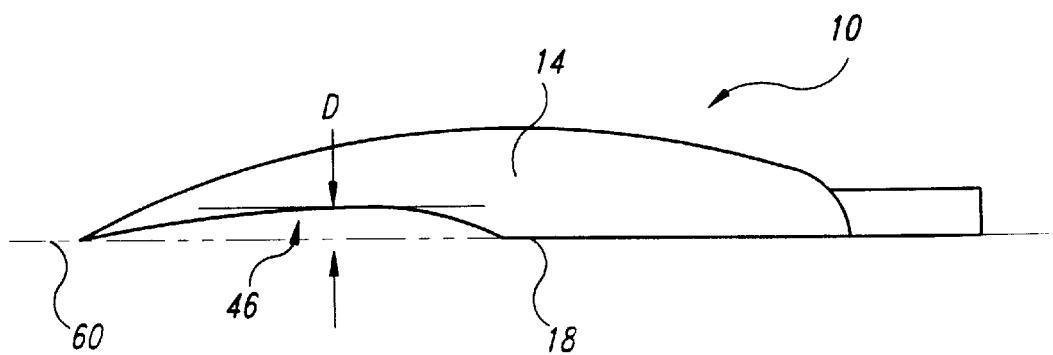
FIG. 11 is a set a-c of side views of an aspect of the invention.
Figure 11B:
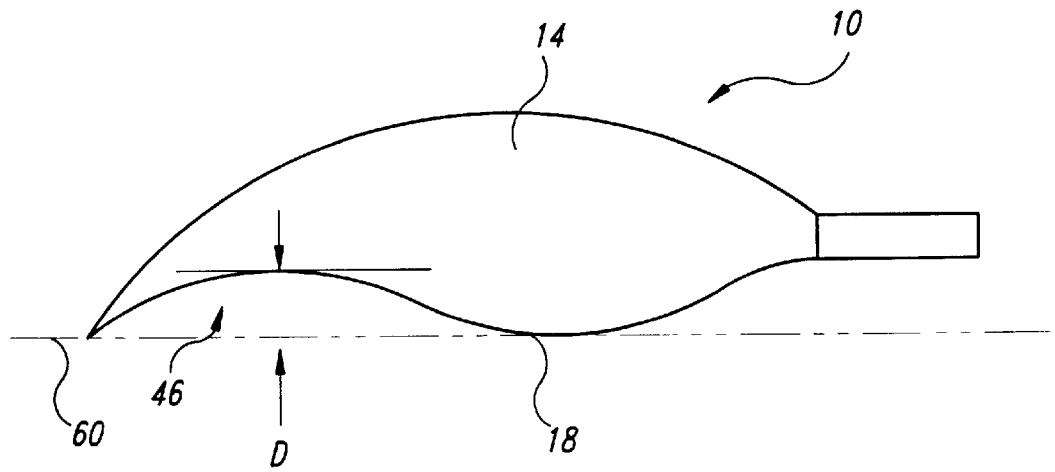
Figure 11A:
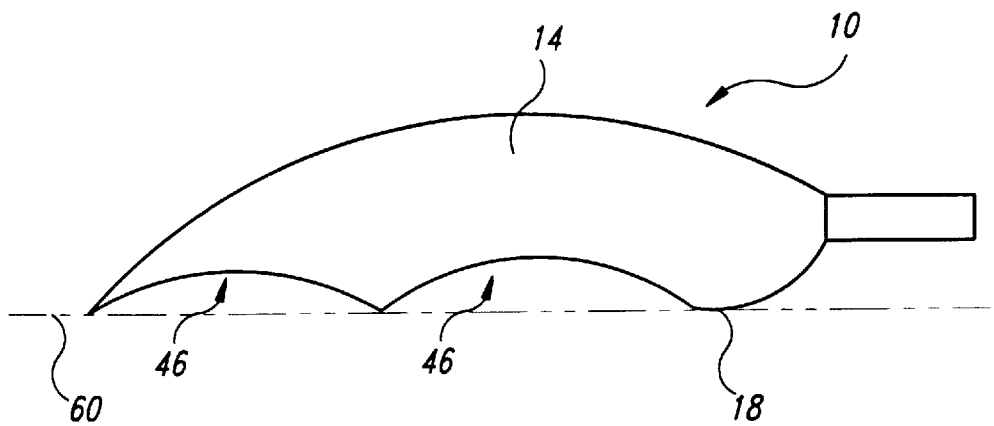

In FIG. 11, variations on scalloping and blade shape are illustrated in views (a)–(c). In view (a) multiple scallops 46 on one side of periphery 18 along the blade length are shown. In views (b) and (c) single scallops 46 are shown in inverted tools 10. The blades 12 of tools 10 are inverted onto flat surface 60, so that there is a space D between periphery 18 and surface 60 at a mid point of scallop 46. Space D is preferably in the range of approximately one half to one and one half inches or so; however, D may have smaller or greater dimensions, ranging from a millimeter or two to more than two inches, depending on the size of the tool overall, on the number and configuration of scallops, and on the intended optimized purpose of the tool. Any of these dimensions for D may be regarded as more than an insubstantial space between the periphery in the scallop and the flat surface.

Figure 7:
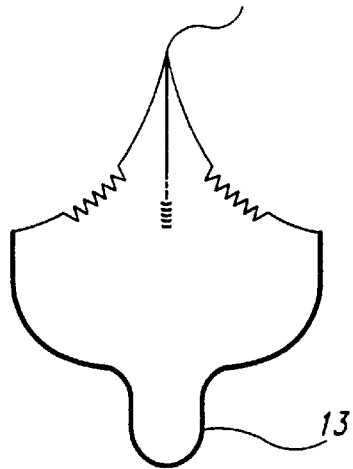
FIG. 7 is a cross section through line 7—7 of FIG. 1 of a base portion of the blade of the invention.

The blade aspect of the invention may be fashioned of any material of sufficient formability, resilience, durability, toughness, strength, flexibility, and corrosion resistance to suit the purpose or purposes of picking, furrowing, plowing, digging, and/or tunneling various soils and other excavants in any given climate and condition. Steels and other metals have been used in preferred embodiments. Stainless steel in particular has proven satisfactory; particularly, for embodiments designed for general indoor and outdoor gardening and planting, 18 gauge #430 bright annealed stainless steel. However, many plastics or other synthetic materials will also serve, as will be appreciated by those skilled in the art; even wood might be fashioned to serve. Depending upon the material selected, geometric factors may be exploited to tailor the strength stiffness, and durability of the tool to any purpose. As an example, the provision of a U section through handle end 13 of blade 12, as shown in FIG. 7, can increase the bending stiffness and strength of the handle or base portions of the tool. Likewise, the tool (particularly the blade of the tool) may be formed by any suitable method, such as stamping, rolling, die cutting or stamping, or even forging.

With regard to aspects and components above referred to, but not otherwise specified or described in detail herein, the workings and specifications of such aspects and components and the manner in which they may be made or assembled or used, both cooperatively with each other and with the other elements of the invention described herein to effect the purposes herein disclosed, are all believed to be well within the knowledge of those skilled in the art. No concerted attempt to repeat here what is generally known to the artisan has therefore been made.

INDUSTRIAL APPLICABILITY

The invention has applicability in the amateur and professional or commercial fields of horticulture, agriculture, and gardening, and in general home use. It greatly eases the burden of the homemaker, gardener, planter, or soil worker by reducing the number, weight, expense, and maintenance requirements of the tools required for his or her task, and the time required for the performance of the task. It may be inexpensively manufactured, and can be distributed and used throughout the world.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

We claim:

1. A blade for a tool, the blade comprising a generally dished region and a pointed tip having a tip point, the blade adapted to engage a handle having a handle axis at an end of the blade opposite from the tip point and the blade having a grip axis substantially parallel to the handle axis;

wherein the tip point lies off of the grip axis by a distance sufficient to allow a user's hand and all of the tool except the tip point to clear a surface of an excavant when the tool is held in an inverted position with respect to the excavant with the grip axis substantially parallel to the surface and the tip point in contact with the excavant.

2. The blade of claim 1, wherein the pointed tip is itself dished.

3. The blade of claim 2, wherein the pointed tip is dished to an extent whereby, when the tool is held with the grip axis substantially vertically aligned and the tip point is held downward, the pointed tip cradles excavant.

4. The blade of claim 1, wherein the blade further comprises at least one serrated edge region.

5. The blade of claim 4, wherein the at least one serrated edge region is adjacent to the pointed tip.

6. A blade for a tool, the blade comprising a generally dished region, the dished region having a base point, a periphery, and a tip, the tip having a tip point also on the periphery, the blade further comprising a handle end adapted to engage a handle having a handle axis at an end of the blade opposite from the tip point and the blade having a grip axis substantially parallel to the handle axis, the base point lying at an end of the dished region generally opposite the tip point but not on the handle end;

wherein a substantial portion of the periphery lies a sufficient distance above a tool reference plane passing through the tip point and the base point to allow a user's hand and all of the tool except the tip to clear a surface of an excavant when the tool is held in an inverted position with respect to the excavant with the grip axis substantially parallel to the surface and the tip point in penetrating contact with the excavant.

7. The blade of claim 6, wherein the tip itself is dished.

8. The blade of claim 6, wherein the blade further comprises at least one serrated edge region.

9. The blade of claim 8, wherein the at least one serrated edge region is adjacent to the tip.

10. A blade for a tool, the blade generally having a length having two ends and a width, the blade comprising a tip at a first end of its length and adapted to engage a handle at a second end and having a region of curvature along the length for a substantial portion of the length and a region of curvature along the width for a substantial portion of the width, the regions of curvature in the blade forming thereby a dished region, the dished region having edges and a periphery defined by its edges, the periphery being scalloped along the length of the blade.

11. The blade of claim 10, wherein the periphery is scalloped to an extent whereby water can not fill substantially the entire dished region.

12. The blade of claim 10, wherein the periphery is scalloped to an extent whereby, when the blade is laid inverted on a flat surface, more than an insubstantial space between the periphery in the scallop and the flat surface can be seen.

* * * * *